United States Patent Office 3,726,657
Patented Apr. 10, 1973

3,726,657
DECOMPOSABLE GLASS
Dennis M. VerDow, Lancaster, Ohio, assignor to Anchor Hocking Corporation, Lancaster, Ohio
No Drawing. Filed June 25, 1970, Ser. No. 49,928
Int. Cl. C03c 15/00, 17/00, 19/00
U.S. Cl. 65—23                                                3 Claims

ABSTRACT OF THE DISCLOSURE

Disclosed herein are decomposable glass articles made from a $SiO_2$–$Na_2O$ glass and having a surface treated by a cuprous chloride ion exchange method which has been found to protect the articles from decomposition by aqueous attack until the ion exchanged surface zone has been ruptured or broken.

BACKGROUND OF THE INVENTION

In signing the National Environmental Policy Act on the first day of this decade, President Nixon declared "The 1970's absolutely must be the years when America pays its debt to the past by reclaiming the purity of its air, its waters, and our living environment." In order to accomplish these objectives it will be necessary to either eliminate littering of our streams, highways, parks and other areas with foreign items, such as cans, bottles, etc., or to make such items from quickly decomposable materials. Efforts are currently being made in both directions. Widespread anti-littering campaigns have become commonplace, fines and penalties for littering have been increased, and small monetary rewards have been offered for the returns of some types of littering items.

Unfortunately, it is recognized that no matter what is done, littering will still continue. Hence, efforts have also been channeled in the direction of developing materials which are decomposable so that the littering item will soon decompose. One such attempt has centered around the fact that it is known in the glass art that glass articles made from silica and soda only, when subjected to moisture, water or other liquids, will decompose. However, until now, such knowledge has only produced laboratory curiosities since liquids could not be stored in such articles.

Within the last several years the United States Government has sponsored a program to produce decomposable glass articles, which can withstand liquid exposure until decomposition is desired. Progress Report No. 1 and No. 2 on "Design of a Water Disposable Glass Packaging Container." Submitted to United States Public Health Service. Solid Wastes Environmental Control Administration Research Grant No. UI 00651. Principal investigator—Samuel F. Hulbert; Co-investigator—C. Clifford Fain, April 1969 and October 1969. In this sponsored research, attempts have been made to produce such articles from silica and soda containing glass compositions. In seeking to eliminate the dissolving of the container by its contents it has been proposed to coat the articles with various types of materials to improve their moisture resistance. The object has been to provide glass containers which may be used for beverages and which, after use, may be broken and thereafter, because of exposure to the elements, decompose. However, even though a great deal of time, effort and money has been spent in trying to develop this concept, no satisfactory technique has been found.

SUMMARY OF THE INVENTION

I have now discovered that such a decomposable glass article may be provided by utilizing a process wherein the glass $SiO_2$—$Na_2O$ article is treated by ion exchange so that at the surface of the glass article an aqueous attack resistant zone is provided. The ion exchange technique to be used is one by which sodium ions—at least in part—in the surface are replaced by copper ions, sufficiently that the copper ion enriched surface zone is impervious, under some conditions, to aqueous attack. One such process is the copper ion exchange method for strengthening glass articles disclosed in U.S. Pat. No. 3,489,546, incorporated by reference herein. Application of this process to a $$SiO-Na_2O$$

glass article provides the article with a continuous integral surface zone of copper ions which protects the water decomposable interior of the glass article. The migration of the ions is limited and, hence, the interior of the glass still essentially includes only $SiO_2$ and $Na_2O$. If the article is a glass beverage container, beverage may be safely stored therein without the container decomposing. After use, the glass container is broken to expose the decomposable interior of the glass to the elements. In a short period of time the article will decompose.

There are other ion exchange techniques disclosed in the prior art. Many utilize an alkali metal as the replacing ion. Since such ions are also subject to aqueous attack these methods would be unsuitable for the practice of my invention.

DESCRIPTION OF THE PREFERRED EMBODIMENTS

Having thus generally described my invention, I will now describe it more specifically in connection with the examples given hereinafter.

The preferred composition range of the glass to be used is 50–70% $SiO_2$ and 30–50% $Na_2O$ on a mol weight percent basis. However, glasses having 45% $SiO_2$ to 80% $SiO_2$ and 20–55% $Na_2O$ can also be employed. With an $SiO_2$ content greater than 70% the deterioration of the untreated glass is extremely slow. With an $SiO_2$ content less than 50% the glass has poor working properties. Glasses in the preferred range exhibit acceptable forming characteristic while having the ability to decompose at a reasonable rate after exposure of the interior glass. In addition to $SiO_2$ and $Na_2O$, other oxides may be present so long as they are not present in sufficient quantity or form that the glass has a moisture resistance so high as will prevent its decomposition at a useful rate. For instance, minor amounts of $Al_2O_3$, ZnO, BaO, $P_2O_5$, MgO and CaO may be added but these are not critical. Those skilled in the art will recognize that increasing the amount of certain of these oxides also increases the moisture resistance of the resultant glass. Of course, since the object of my invention is to provide a decomposable glass, use of amounts of such oxides that will prevent decomposition should, therefore, be avoided; however, they can be used to alter melting, working, or other physical and chemical characteristics of the basic glass.

I shall now describe several specific examples of the production of an article according to my invention. Because of its ease of melting and ease of working, Example 2 below can be considered to be the preferred example of the practice of my invention.

Glass batches were prepared so that upon melting they provided glasses having the following percent composition, calculated on a mol basis:

|  | Percent | | | | |
| --- | --- | --- | --- | --- | --- |
| Example | 1 | 2 | 3 | 4 | 5 |
| $SiO_2$ | 80 | 70 | 60 | 50 | 45 |
| $Na_2O$ | 20 | 30 | 40 | 50 | 55 |

The glasses of Examples 1 through 3 melted at higher temperatures than the glasses of Examples 4 and 5. The glass of Examples 1 through 3 could be easily drawn into rods.

A number of rods were formed from the glasses of Examples 1 through 5. Some were then subjected to the cuprous chloride treatment disclosed in Shonebarger U.S. Pat. No. 3,489,546. Others were not.

The process of the said patent was practiced as follows. The glass rods to be treated were suspended over a stainless steel beaker containing copper chloride. The rods and beaker were placed in an oven at ambient temperature. The oven was then heated to about 1000° F. at a rate of about 1000° F. per hour. The rods were left in the oven for about 20 minutes, removed, and air cooled.

The manner in which the $SiO_2$—$Na_2O$ articles are treated according to the process of the said patent may vary according to the teachings of said patent. The treating temperature and duration of treatment are governed by the maximum temperature a particular composition can be exposed to without undesirable deformation and the vapor pressure of the cuprous chloride at that temperature.

Rods formed from the glasses of Examples 1–5, treated and untreated, were submerged in water for varying periods of time and at varying temperatures to test their resistance to moisture. In one test no deterioration of the treated rods was noted after 67 hours. In contrast, untreated rods of the same composition had decreased in size about 40% of their original thickness after only 67 hours. Rods from the treated glasses were broken to expose their untreated interiors, the interior was found to be readily decomposable when subjected to moisture. The remaining treated surface zone was attack resistant, but was so thin that it crumbled into tiny fragments.

In the foregoing examples the glass rods were treated by the cuprous chloride method immediately after they were formed. Those skilled in the art will, of course, recognize that if the ion exchange treating method is postponed until some future time that the glass rods should not be exposed to moisture or else they will be dissolved.

Having thus described my invention, I claim:

1. A method for making a glass article and destroying it after usage comprising
   melting a batch of glass making ingredients sufficient to provide a mole weight basis of glass consisting essentially of from about 45–80% $SiO_2$ and from 20–55% $Na_2O$,
   forming an article from said glass,
   treating at least one surface of said article so as to replace sodium ions with moisture resistant copper ions, and
   breaking said article after usage and exposing the untreated portions of said article to moisture whereby said untreated portions decompose.

2. The method of claim 1 wherein said batch consists essentially of 50–70% $SiO_2$ and 30–50% $Na_2O$.

3. A method for making a glass bottle and destroying it after usage comprising,
   melting a batch of glass making ingredients to provide a water decomposable glass including on a mol weight basis, about 30–50% $Na_2O$ and 50–70% $SiO_2$,
   forming an article from said glass,
   subjecting said article to ion exchange with cuprous chloride sufficiently that sodium ions in a surface zone of said article are replaced with copper ions so that a copper ion enriched surface zone is formed on said article which will resist aqueous attack under use conditions, and
   breaking said article after usage and exposing the portions of said article which have not been subjected to said ion exchange treatment to moisture whereby said untreated portions decompose.

References Cited

UNITED STATES PATENTS

| | | | |
|---|---|---|---|
| 3,489,546 | 1/1970 | Shonebarger | 65—30 |
| 3,502,454 | 3/1970 | Shonebarger | 65—30 |
| 3,537,848 | 11/1970 | Lane | 65—30 X |
| 3,479,217 | 11/1969 | Spanoudis | 65—60 X |
| 3,337,321 | 8/1967 | Teague, Jr. et al. | 65—60 X |
| 2,428,600 | 10/1947 | Williams | 65—30 X |
| 3,415,402 | 12/1968 | Webber | 215—1 C |

OTHER REFERENCES

American Ceramic Society Bulletin, April 1969, p. 433, vol. 48, No. 4.

Engineering Index, Inc., 345 E. 47th Street, New York, N.Y., pp. 698–14472, Design of Water-Disposable Packaging Container, June 9, 1971, Patent Office Lib.

"Improving Package Disposability," by S. F. Hulbert, C. C. Fain, M. M. Cooper, D. T. Ballenger, and C. W. Jennings; paper presented at the First National Conference on Packaging Wastes, San Francisco, Calif., Sept. 24, 1969, pp. 2, 4, 25, 38 and Abstract.

FRANK W. MIGA, Primary Examiner

U.S. Cl. X.R.

65—30, 32, 60, 114; 106—52; 117—124 C & B; 215—1 C